Nov. 15, 1927.
J. C. STAFFORD
LATHE TOOL HOLDER
Filed May 25, 1926
1,649,553
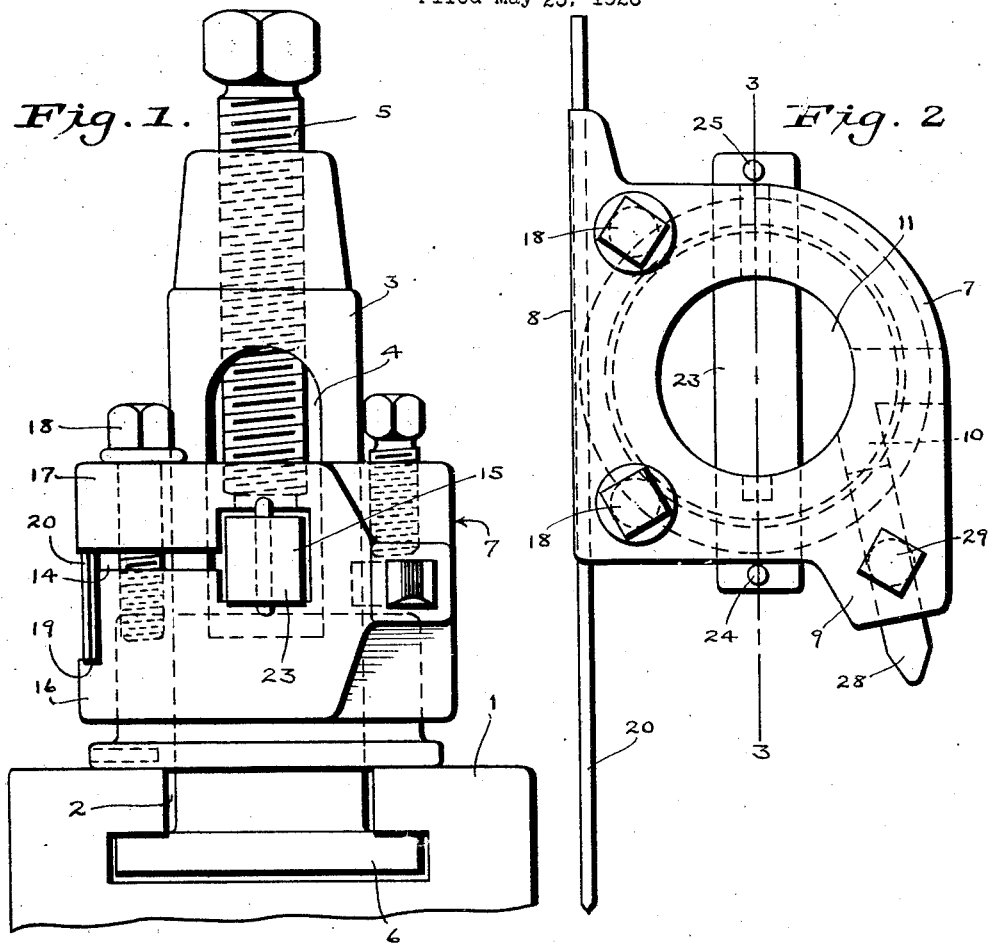
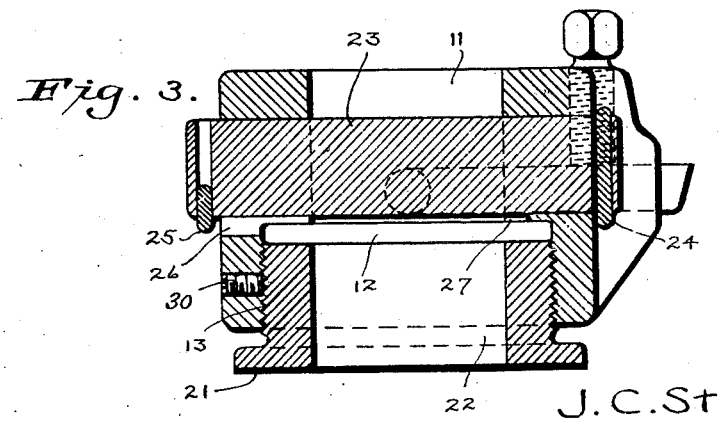
INVENTOR.
J. C. Stafford
BY
Geo. P. Kimmel ATTORNEY.

Patented Nov. 15, 1927.

1,649,553

UNITED STATES PATENT OFFICE.

JOHN C. STAFFORD, OF CLEVELAND, OHIO.

LATHE-TOOL HOLDER.

Application filed May 25, 1926. Serial No. 111,627.

This invention relates to a lathe tool holder and has for its primary object the provision, in a manner as hereinafter set forth, of an improved type of construction of a clamp or holder for holding in working position a turning tool and a cutting off and threading tool.

The invention contemplates the provision of a clamping structure through the center of which the usual lathe tool post is adapted to extend. The clamping screw of the tool post acts to secure the tool clamp securely against the top of the post carriage, so that the tool clamp is enabled to hold a pair of tools in operative position, in such a manner that when the operator has finished using one of the tools, the work can be moved directly to and operate upon by the other tool held by the holder, without the trouble of removing the first tool.

The invention has for a final object the provision, in a manner as hereinafter set forth, of a lathe tool clamp which is of simple construction, strong and durable, designed to save time and labor and comparatively inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claim.

In the drawing:—

Figure 1 shows a lathe tool post in side elevation, showing the tool clamp structure embodying this invention, mounted thereon.

Figure 2 shows the tool clamp embodying this invention in top plan, the tool post being removed.

Figure 3 shows a transverse section taken upon the line 3—3 of Figure 2.

Referring now to the drawing in detail wherein like numerals of reference indicate corresponding parts throughout the several views, the numeral 1 indicates the usual tool post carriage of a lathe, the T-slot of the carriage being indicated by the numeral 2.

A lathe tool post of the usual construction is indicated by the numeral 3, these posts as is well known, being provided with the transverse recess 4, the longitudinally extending clamping screw 5 which is threaded into the upper end of the post and is adapted to extend throughout the recess 4 in the manner shown, and the head 6 which is adapted to be positioned in the T-slot of the carriage 1.

The tool clamp embodying this invention comprises a relatively large flat body 7 having a straight side 8 and further having a nose portion 9 extending from the opposite side thereof, the nose portion 9 having a passage 10 running therethrough, which passage extends at an obtuse angle with respect to the side 8. The body 7 has formed therethrough parallel with the flat side 8 transversely of the length of this side, the pair of aligned passages 11 and 12, respectively, the passage 12, as shown in Figure 3, being of materially greater diameter than the passage 11 and having threads 13 formed upon the wall thereof.

The body 7 is split transversely of the longitudinal center of the passages 11 and 12, as indicated at 14, the split being formed from the side 8 inwardly to a point beyond the center of the body. At the central portion of the body the slit 14 merges into a polygonal passage 15 which extends through the body parallel with the slit 14 and through the longitudinal center of the passage 11. From this description it will be seen that the body 7 at one side, due to the slit 14, is formed into a pair of spaced portions 16 and 17 which may be sprung together by suitable straining means such as the clamping screws 18 which pass through the upper member 17 into and engaging the lower member 16. The portion 16 has its outer face recessed as at 19 to receive a cutting off and threading tool 20, the upper edge of the tool 20 when positioned in the recess 19 being engaged by the upper portion 17 and as will be readily seen when the upper portion 17 is sprung downwardly by means of the bolts or screws 18, the tool 20 will be securely clamped between the portions 16 and 17 in the manner indicated in Figures 1 and 2.

Adapted to be threaded into the passage 12, is an adjusting collar 21 having a central passage 22 therethrough which is of the same diameter as the passage 11.

When the tool clamp body 7 is in position, the tool post 3 extends through the passages 11 and 22 and the lower flanged portion of the collar 21 rests upon the carriage 1.

When in such position, a clamp bar 23 is extended through the passage 15 in the body 7 and by turning down the screw 5 to engage the top of the clamp bar 23, the head 6 of the tool post will be drawn up to engage tightly in the slot 2 of the carriage and the clamp body 7 will be held securely down upon the top of the carriage as shown in Figure 1.

Extending transversely of one end of the clamp bar 23 is a retaining pin 24 and there is extended into the underside of the bar 23 at the other end thereof a short pin 25. A slot 26 is formed in the lower side of the passage 15 upon one side of the body 7 so that the pin 25 can pass to allow the bar 23 to be partially withdrawn from the passage 15. A similar short slot 27 is formed in the other side of the body in alignment with the slot 26 to allow the pin 25 to pass into the body far enough to give a clearance for the withdrawal of the post 3. The bar 23 is thus easily and quickly shifted for the insertion or removal of the tool post 3 and at the same time is securely held against complete removal.

A turning tool 28 is extended into the passage 10 at the opposite side of the clamp from the cutting off blade or tool 20 and this turning tool may be held securely in position by means of the clamp screw 29.

When the clamp 7 and tool post 3 are in position as shown in Figure 1, adjustment may be made for locating the center of the lathe spindle, by loosening the clamp screw 5 and turning the adjusting collar 21 to raise or lower the clamp body 7 to the desired position whereupon the clamp screw 5 is again threaded downwardly to bind against and force the clamp bar 23 downwardly at the same time drawing up upon the post 3 to cause the head 6 to engage tightly in the T-slot 2. By this means all turning, threading, form cutting and cutting off tools can be kept in line with the center of the work.

A set screw 30 is tapped through the side of the body 7 and engages the threaded portion of the collar 21, so when proper vertical adjustment has been made by means of the collar the set screw can be employed to secure the two members together and thereafter the entire structure can be removed from the lathe without changing the other adjustments.

It will thus be seen from the foregoing description and accompanying drawing that the clamp 7 may be made to carry a turning tool and a cutting off threading blade or tool in the manner shown so that when a piece of work is acted upon by the turning tool and the operation thereof is completed, the cutting off and threading tool may be immediately brought into operation and the work continued without the necessity of stopping to change tools. A decided saving in time and work is thus had.

Having thus described my invention what I claim is:—

A lathe tool holder, comprising a tool post adapted for slidable connection with a lathe carrier, a sleeve loosely surrounding the post and having contact with the lathe carrier, a transversely recessed block loosely engaged over the post and vertically adjustable on the sleeve and having a split in one side coextensive with the recess in said block, a socketed extension for the block and disposed tangentially to the post, a binding screw in the post, and set screws engaged in the block at its split side and intersecting the split.

In testimony whereof, I affix my signature hereto.

JOHN C. STAFFORD.